United States Patent [19]
Wake

[11] 3,709,621
[45] Jan. 9, 1973

[54] MACHINE TOOL
[75] Inventor: John A. Wake, Auburn, Mass.
[73] Assignee: Cincinnati Milacron-Heald Corp., Worcester, Mass.
[22] Filed: June 16, 1971
[21] Appl. No.: 153,702

[52] U.S. Cl. ..................................408/11, 408/14
[51] Int. Cl. ........................................B23b 47/20
[58] Field of Search.............408/11, 10, 8, 14, 6, 12; 83/542, 527, 522

[56] References Cited
UNITED STATES PATENTS
3,244,029  4/1966  Jacobson..............................408/10
3,220,286  11/1965  Jacobson et al......................408/12

Primary Examiner—Gil Weidenfeld
Attorney—Norman S. Blodgett

[57] ABSTRACT

A machine tool having a table which is slidable on ways and which is driven by a torque motor; a stop is provided to terminate table movement, which stop is relatively flexible and is provided with a strain gage; a computer is used for controlling the torque on the motor and changing from one torque to another at various positions in table travel.

5 Claims, 6 Drawing Figures

PATENTED JAN 9 1973

INVENTOR.
JOHN A. WAKE
BY
Novan S. Blodgett
ATTORNEY

MACHINE TOOL

BACKGROUND OF THE INVENTION

In the design of machine tools, there are many situations where a table carrying a tool is moved over a set of ways with a programmed speed and displacement. In a way-type machine tool, a large number of such tables on ways may be provided. It has been the practice in the past to operate these table movements toward and away from a workpiece moving from station to station along a main way of the machine by using hydraulic cylinders. In order to provide even the simplest type of table movement, a considerable number of hydraulic valves, conduits, and electrical switches must be provided, as well as a source of hydraulic fluid. This means that there is a large number of pumps, sumps, flexible conduits, and the like located around the normal machine parts, so that even a relatively simple way-type machine tool has an awkward appearance, is difficult to keep clean, and presents certain dangers to the personnel working around it. Furthermore, in order to change the way-type machine operation for a different workpiece, it is necessary to change switches and valves, and to use different size orifices in the hydraulic circuitry to produce a different set of feeds and speeds. Attempts to provide such a machine for general purpose, thus permitting rapid changes from one workpiece to another, have resulted in very complicated and expensive apparatus as well as a system which is quite unreliable. Furthermore, many such machines include a terminating stop point in the table movement to allow the tool to make a bottoming lateral surface cut; the repeatability of location of such a surface has always been very poor. These and other difficulties experienced with the prior art devices have been obviated in a novel manner by the present invention.

It is, therefore, an outstanding object of the invention to provide a machine tool having an electrically-driven table which is capable of good repeatability at a stop position.

Another object of this invention is the provision of a machine tool, particularly for use in a multi-station transfer line, which is free of all of the accessories necessary for hydraulic operation.

A further object of the present invention is the provision of a machine tool having accurate control of force between the tool and the workpiece and capable of easy change or adjustment of torque, speed, and distance in the machine tool cycle.

With these and other objects in view, as will be apparent to those skilled in the art, the invention resides in the combination of parts set forth in the specification and covered by the claims appended hereto.

SUMMARY OF THE INVENTION

In general, the present invention has to do with a machine tool having a base and a tool-carrying table slidably mounted on the base. A screw-and-nut drive means joins the table to the base to bring about relative slidable movement between them and a motor is connected to the drive means for the operation thereof. The motor has the characteristic of substantially constant torque irrespective of speed. A stop is mounted on the base and engageable by the table at a predetermined part of the said relative movement, the stop including a strain gage giving a signal proportional to the force on the stop. More specifically, the motor is connected to a control means including a computer for regulating the torque and speed thereof, and the strain gage is connected to the control means to shift the operation of the motor to a low torque level when the stop deflection reaches a predetermined level.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
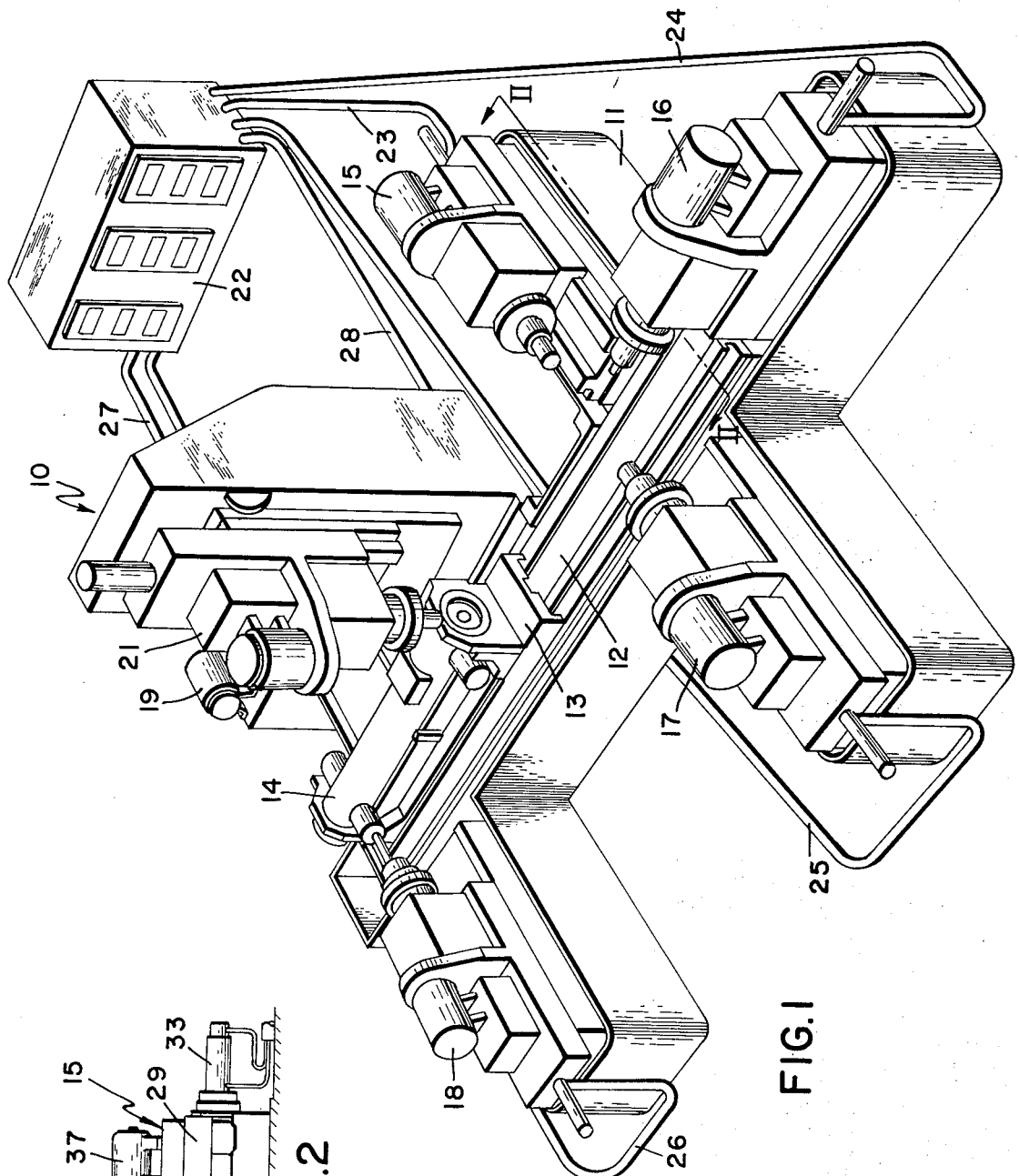
FIG. 1 is a perspective view of a machine tool incorporating the principles of the present invention.

Referring first to FIG. 1, which best shows the general features of the invention, the machine tool, indicated generally by the reference numeral 10, is shown as having a base 11 including an elongated way 12 on which is mounted a transfer table 13 and on which is, in turn, mounted a workpiece 14. Arranged around the way 12 is a plurality of machining units 15, 16, 17, 18, 19, and 21 which are connected to a control means 22 by cables 23, 24, 25, 26, 27, and 28, respectively. Control means 22 includes a computer capable of being programmed for various types of workpieces 14 to regulate the operation of the various machining units.

Figure 2:
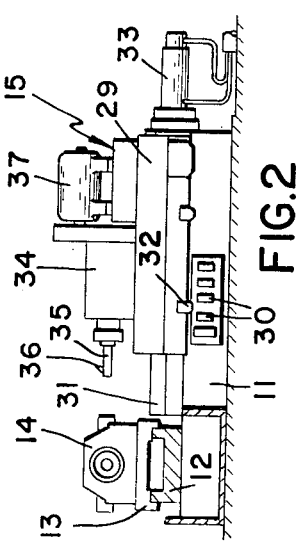
FIG. 2 is a side view of a portion of the machine tool taken on the line II—II of FIG. 1.

In FIG. 2 it can be seen that the machining unit 15 consists of a table 29 slidable on ways 31 and extending at a right angle to the ways 12 associated with the transfer table 13. An adjustable dog 32 on the table is in position successively to engage switches 33 mounted on the side of the base 11. Also mounted on the base 11 is a motor 33 for bringing about movement of the table 29 relative to the base 11. Mounted on the upper surface of the table 29 is a toolhead 34 from which extends a spindle 35 having at one end a cutting tool 36. An electric motor 37 is connected to the toolhead for driving the spindle 35.

Figure 3:
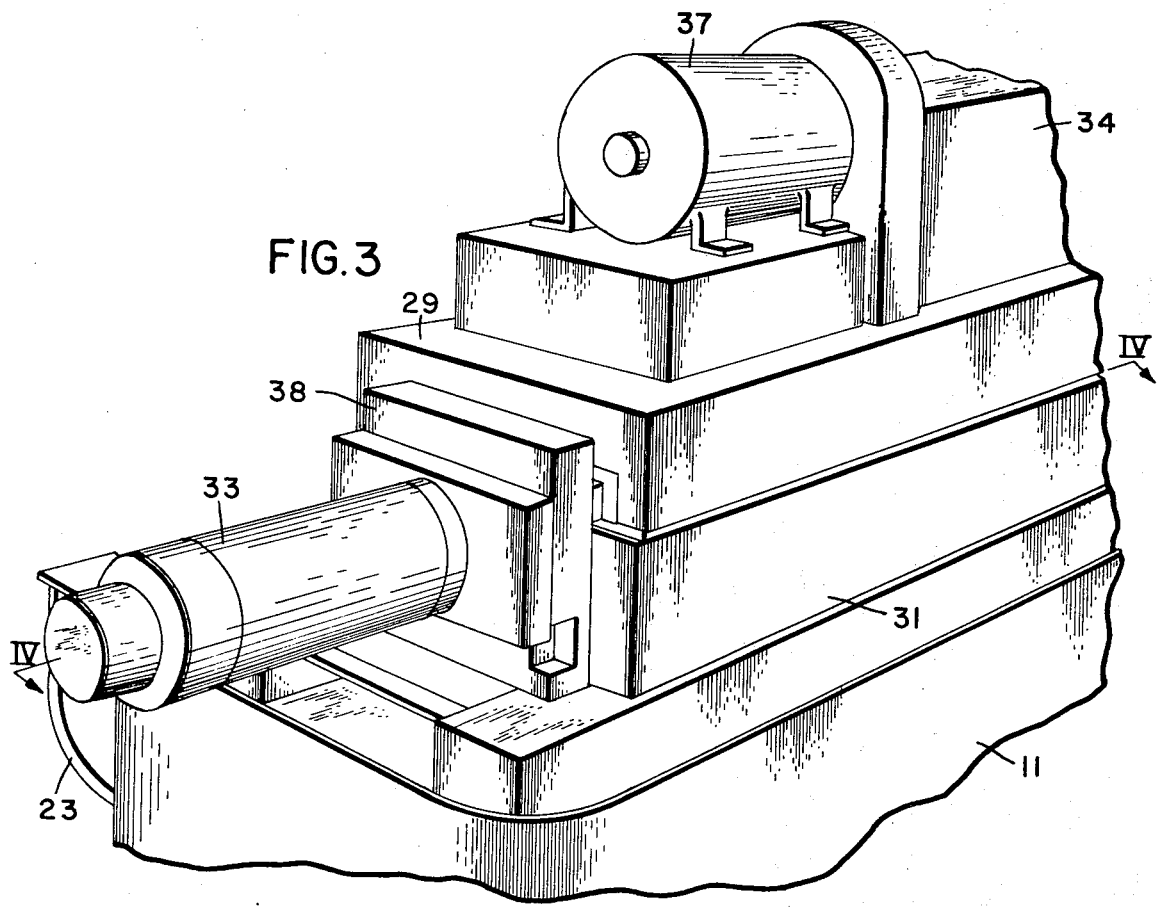
FIG. 3 is a perspective view of the portion of the machine tool shown in FIG. 2.

In FIG. 3, it can be seen that the motor 33 is mounted on a slab 38 extending across the base 11 between the ways 31. The cable 23 extends downwardly from the motor 33.

Figure 4:
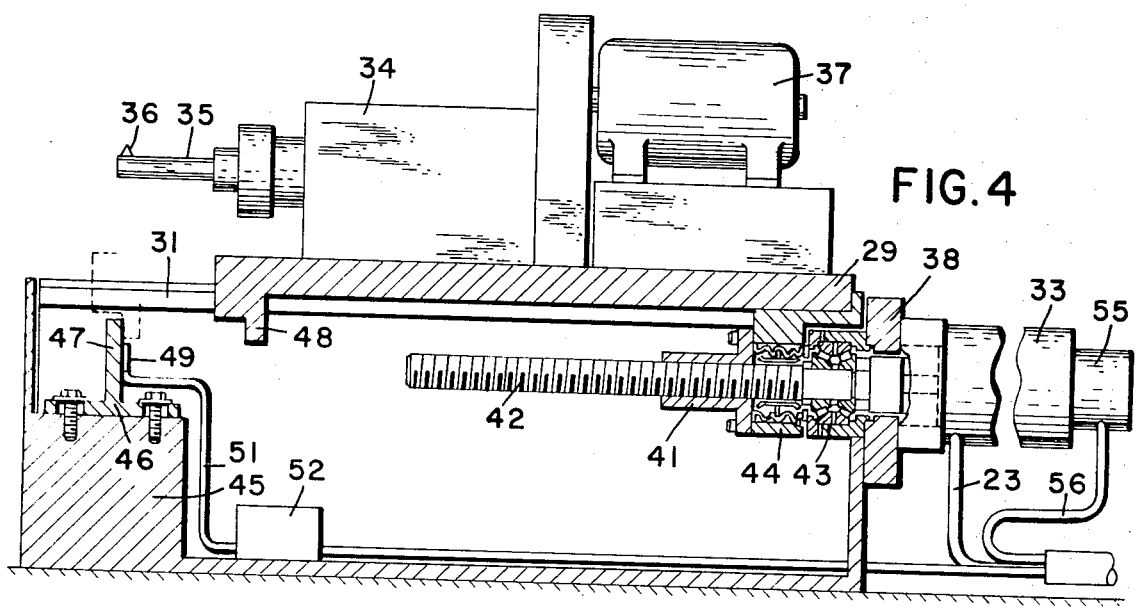
FIG. 4 is a vertical sectional view of a portion of the machine tool taken on the line IV—IV of FIG. 3.

The sectional view shown in FIG. 4 illustrates how the table 29 is provided with a nut 41 which is threadedly engaged by a screw 42. The screw extends through a roller bearing 43 which is protected by suitable seals 44. Screw 42 extends through the slab 38 and is directly connected to the shaft of the motor 33. It can be seen that the outboard end of the motor 33 is provided with a tachometer generator 55. The signal extends to the computer 54 by means of the cable 56.

At the other end of the base 11 from the motor 33 is a shelf 45 on the upper horizontal surface of which is mounted a stop 46. The stop is adjustable longitudinally of the table, i.e., in a direction parallel to the ways 31 by a slot-and-bolt connection. The stop is provided with an upstanding finger 47. This finger is cantilever-supported and is in a position to be engaged by an abutment 48 extending downwardly from the underside of the table 29. On the surface of the finger 47 is fastened a strain gage 49 which is connected by a cable 51 to an analyzer and amplifier circuit 52 whose output is connected through a cable 53 to the control means 22. The finger 47, the strain gage 49, and the circuit 52 are shown and described in detail in the patent of Jacobson No. 3,244,029, which issued on Apr. 5, 1966. Leaving the circuit 52 by way of the cable 53 is an electrical signal whose magnitude is in direct proportion to the amount of deflection of the finger 47 in response to pressure on it from the abutment 48.

Figure 5:
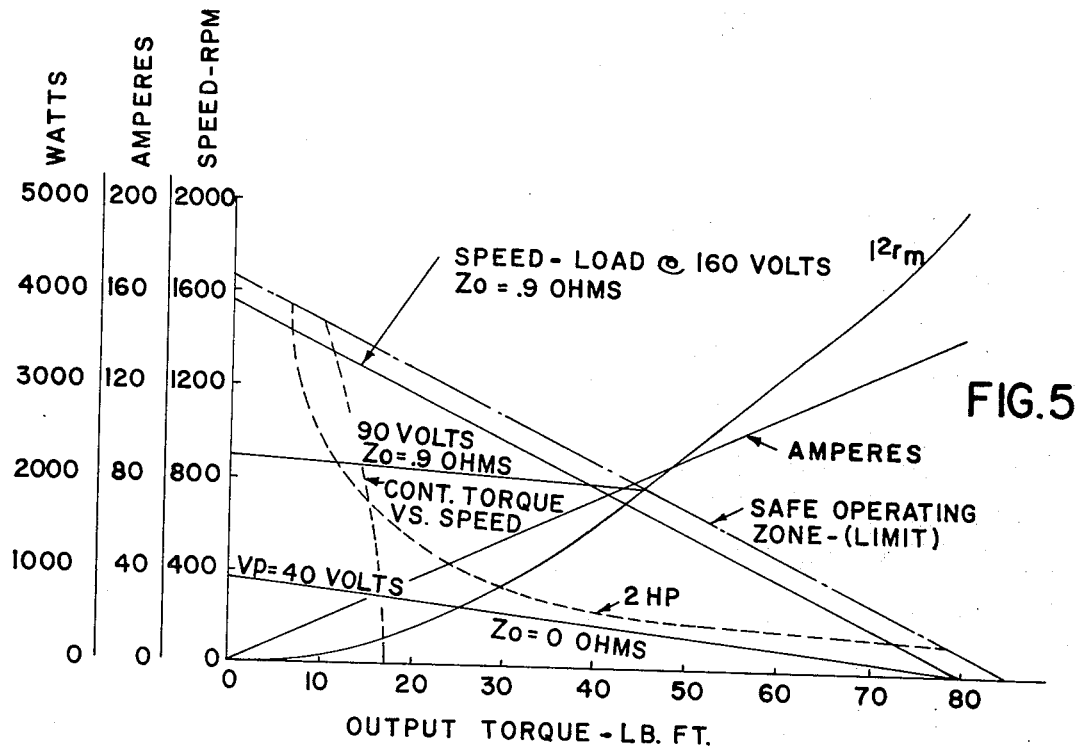
FIG. 5 is a graph showing various characteristics of a motor forming part of the invention.
Figure 6:
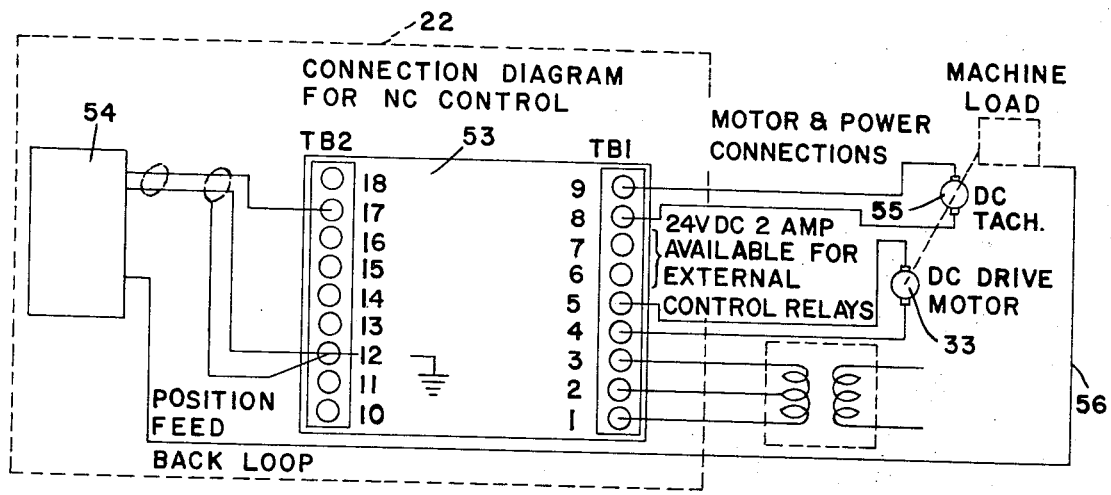
FIG. 6 is a diagrammatic view of the control means for the machine tool.

Referring to FIG. 5, the graph shows the various characteristics of the motor 33. The motor is of the type known as a "torque" motor, such as the direct-drive DC motor-tachometer manufactured and sold by Inland Motor Corporation Of Virginia, known as the TT-5746 motor. In the preferred embodiment, this motor can provide continuous torque of 17 pound-feet with a peak torque of 85 pound-feet. It is a totally enclosed, non-ventilated motor. As such, this continuous-duty, direct-drive combination DC torque motor-tachometer generator provides a high torque-to-inertia ratio. It is provided with DC current from a 100 watt transistorized drive system 53 (see FIG. 6) contained in the control means 22 which also contains a computer 54.

The operation of the machine tool 10 will now be readily understood in view of the above description. The workpiece 14 is moved with the table 13 along the ways 12, so that it comes into operative relationship to the various stations or machining units 15, 16, 17, 18, 19, and 21. These machining units are all similar to the unit 15 which has been described above in detail. Each of the machining units is provided with the motor similar to the motor 33 of the unit 15 and the stop 46, as well as the switches 33. The computer 54 of the control means 22 regulates the operation of all of these machining units in sequence (and at times together) on the workpiece. Referring particularly to FIG. 4, it can be seen that the motor 33, by rotating the screw 42, causes the nut 41 and the table 29 to move to the left. At various times in its movement, the tool 36 will come in contact with portions of the workpiece 14 to perform various operations. During the longitudinal movement of the table 29, the dog 32 engages the switches 33 to set up different motor conditions for rotation of the spindle 35 and the advancement of the table under the impetus of the motor 33. Eventually, the table 29 reaches the stop 46 and is engaged therewith through the medium of the abutment 48. At the time of engagement, the motor 33 is providing the table drive means with a torque of high value. When the abutment 48 engages the finger 47, this torque continues to operate to bend the finger 47. From the curve in FIG. 5, it can be seen that the torque, even at zero speeds, is almost the same as at substantial speeds, so that the stalling of the motor does not cut off torque or force pressure against the finger 47. The signal leaving the strain gage 49 and its circuit 52 rises as the deflection of the finger takes place at a predetermined voltage or deflection of the finger. The control means indicates a change in torque required from the motor 33. The torque in the motor 33 is reduced substantially, so that the table 29 comes to a stop with a given deflection of the finger 47 and the torque from the motor presses the table against the finger with a fixed torque and force. The tool 36 is used for a suitable operation, such as forming a radial surface on a flange or bottoming out a bore; the radial surface thus formed is repeatable from workpiece to workpiece with extreme accuracy because of the construction and operation described above.

It can be seen that the present invention results in a machine tool which is not surrounded by various hydraulic equipment, such as valves, sumps, pumps, flexible conduits, and the like which are not only dangerous to the operator but are also aesthetically unpleasing. Because of the electrical characteristics of the apparatus, it is possible to use a digital computer 54 to regulate the entire operation, including the operations of the individual machining units.

The tachometer generator 55 issues digital pulses responsive to an angular increment of rotation of the motor 33, so that the issuance of pulses corresponds to the number of revolutions. The position of the table 29 is also indicated by means of a counter contained in the computer. Fundamentally, the switches 33 are actuated during the motion of the table and act through potentiometers of selected value into the lines leading to the drive system. This causes a different DC current to pass to the motor 33 and thus adjust the torque. The table with its abutment 46 is pressed against the stop 46 for a given length of time, usually the length of time necessary to perform the machining operation at that particular point. Because of the flexibility of the computer, it is only necessary to change programming to operate with a different workpiece 14. Furthermore, with a given type of workpiece, it is possible, if the surface finish deteriorates, for instance, to change the feed, speed, and so on of the machine to correct such a deficiency in the finished workpieces.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A machine tool, comprising
a. a base member,
b. a table member adapted to carry a tool and slidably mounted on the base,
c. a drive means joining the table member to the base member to bring about relative slidable movement between them,
d. a motor drivingly connected to the drive means for the operation thereof, the motor having the characteristic of substantially constant torque irrespective of speed, and
e. an abutment on one of said members engagable with a stop of the other of said members at a predetermined part of the said relative movement, the stop including a strain gage giving a signal proportional to the force on the stop, and f. control means associated with said motor and said strain gage to regulate the torque level of the motor in response to the deflection of said stop.

2. A machine tool as recited in claim 1, wherein the motor is connected to said control means and said control means includes a computer for regulating the torque level.

3. A machine tool as recited in claim 2, wherein a plurality of limit switches are located along the base member to be operated sequentially by the table member during the said relative movement, and wherein the switches are connected to the control means to bring about changes in the operation of the motor.

4. A machine tool as recited in claim 2, wherein the strain gage is connected to the control means to shift the operation of the motor to a low torque level when the stop deflection reaches a predetermined level.

5. A machine tool as recited in claim 1, wherein the drive means is of the screw-and-nut type, and wherein the stop is mounted on the base member for engagement by the table member.

* * * * *